(12) United States Patent
Pei et al.

(10) Patent No.: US 6,272,109 B1
(45) Date of Patent: Aug. 7, 2001

(54) HIERARCHICAL SCHEDULES FOR DIFFERENT ATM TRAFFIC

(75) Inventors: Tong-Bi Pei, Milpitas; Cuneyt M. Ozveren, Fremont, both of CA (US)

(73) Assignee: Cabletron Systems, Inc., Rochester, NH (US)

( * ) Notice: Subject to any disclaimer, the term of this patent is extended or adjusted under 35 U.S.C. 154(b) by 0 days.

(21) Appl. No.: 08/972,267

(22) Filed: Nov. 18, 1997

(51) Int. Cl.$^7$ .............................. H04J 3/17; H04L 12/56

(52) U.S. Cl. .................... 370/230; 370/352; 370/395; 370/462; 370/468

(58) Field of Search .................................. 370/230, 352, 370/353, 354, 395, 397, 398, 399, 409, 462, 468; 709/240

(56) References Cited

U.S. PATENT DOCUMENTS

| | | | |
|---|---|---|---|
| 5,392,280 | 2/1995 | Zheng | 370/60 |
| 5,463,620 | 10/1995 | Sriram | 370/468 |
| 5,515,363 | 5/1996 | Ben-Nun | 370/399 |
| 5,619,502 | 4/1997 | Kahn et al. | 370/397 |
| 5,706,288 | 1/1998 | Radhakrishnan | 370/468 |
| 5,712,851 | * 1/1998 | Nguyen et al. | 370/399 |
| 5,745,477 | 4/1998 | Zheng | 370/468 |
| 5,751,709 | * 5/1998 | Rathnavelu | 370/395 |
| 5,754,530 | 5/1998 | Awdeh | 370/232 |

(List continued on next page.)

FOREIGN PATENT DOCUMENTS

| | | | |
|---|---|---|---|
| 0 471 379 | 2/1992 | (EP) | H04L/12/56 |
| 0 700 186 A1 | 3/1996 | (EP) | H04L/12/56 |
| 0 717 532 A1 | 6/1996 | (EP) | H04L/12/56 |
| 2 307 823 | 6/1997 | (GB) | H04L/12/56 |

OTHER PUBLICATIONS

International Search Report from Internation Patent Application PCT/US98/24540, filed Nov. 17, 1998.

(List continued on next page.)

Primary Examiner—Min Jung
(74) Attorney, Agent, or Firm—Wolf, Greenfield & Sacks, P.C.

(57) ABSTRACT

An ATM scheduler in accord with the invention supports multiple transmission traffic types (e.g. CBR, VBR and ABR) for each of a plurality of virtual path connections (VPCs) on an ATM link. The scheduler maintains one or more scheduling tables defining the hierarchy of traffic types and the scheduling for each type of traffic within each virtual path. In each cell transmit time, one VPC is identified as assigned to the opportunity to transmit in the respective cell transmit time. Each virtual path connection supports at least one type of high priority traffic, such as constant bit rate (CBR) traffic, over a plurality of virtual circuit connections. The scheduler determines if there is a high priority service virtual circuit connection (VCC), from among those associated with the identified VPC, and that has been assigned the current cell time slot. If the scheduling device identifies such a VCC, then the scheduler provides the transmit opportunity for that VCC. For example, if the VCC has CBR service, a cell for that VCC is transmitted over the link in the respective cell transmit time. If the VCC has variable bit rate service, a cell is transmitted if there is in fact a cell ready to send over that VCC. Also, during processing for each cell transmit time, the ATM scheduler accesses a link list. The link list identifies at least one available bit rate (ABR) service type VCC. The link list identified is one associated with the indexed virtual path connection. The ATM scheduler preferably transfers the accessed link list to an ABR work list associated with the indexed VPC. During each respective cell transmit time, if the processing relating to the high priority service(s) did not result in cell transmission in the time slot, the scheduler examines the ABR work list to identify an ABR service type VCC for which there is a cell that is ready to transmit, and the cell for that circuit is transmitted over the link in the respective cell transmit time.

24 Claims, 9 Drawing Sheets

U.S. PATENT DOCUMENTS

| | | | |
|---|---|---|---|
| 5,818,842 | | 10/1998 | Burwell et al. .................. 370/397 |
| 5,864,538 | | 1/1999 | Chong .................. 370/395 |
| 5,864,540 | | 1/1999 | Bonomi .................. 370/235 |
| 5,946,297 | * | 8/1999 | Calvignac et al. .................. 370/230 |
| 5,953,336 | * | 9/1999 | Moore et al. .................. 370/395 |
| 5,959,993 | * | 9/1999 | Varma et al. .................. 370/397 |
| 5,987,031 | * | 11/1999 | Miller et al. .................. 370/412 |
| 6,011,798 | * | 1/2000 | McAlpine .................. 370/395 |

OTHER PUBLICATIONS

Hluchyi M.G., et al.: "Queueing Disciplines For Integrated Fast Packet Networks" Discovering A New World Of Communications, Chicago, Jun. 14–18, 1992, vol. 2, Jun. 14, 1992, pp 990–996, Institute of Electrical and Electronics Engineers.

Park K.: "Self–Organized Multi–Class QOS Provision for ABR Traffic In ATM Networks", Proceedings For The 1996 IEEE Fifteenth Annual International Phoenix Conference on Computers and Communications, Scottsdale, Mar. 27–29, 1999, No. CONF. 15, Mar. 27, 1996, pp 446–453, Institute of Electrical and Electronics Engineers.

Saito H., et al.: "Traffic Control Technologies in ATM Networks", IEICE Transactions, vol. E74, No. 4, Apr. 1, 1991, pp 761–771, p. 762, left–hand column, line 17–p. 763, right–hand column, line 30.

\* cited by examiner

| CELL TIME | VPC | HIGH PRIORITY | LOW PRIORITY | ABR POINTERS | | NEXT SERVE TIME |
|---|---|---|---|---|---|---|
| a | VP1 | VC1 |     | H1 | T1 | b |
| e | VP1 |     | VC2 | H5 | T5 | f |
| b | VP2 |     | VC3 | H2 | T2 | c |
| f | VP2 |     | VC1 | H6 | T6 | g |
| c | VP3 |     | VC2 | H3 | T3 | d |
| g | VP3 | VC2 |     | H7 | T7 | h |
| d | VP0 |     | VC1 | H4 | T4 | e |
| h | VP0 | VC2 |     | H8 | T8 | a |

SERVICE ORDER a-b-c-d-e-f-g-h-a

FIG. 5

STATIC TABLE

| CELL TIME | VP INDEX | HIGH PRIORITY | LOW PRIORITY |
|---|---|---|---|
| a | VP1 | VC1 | VC4 |
| b | VP2 |     | VC3 |
| c | VP3 |     | VC2 |
| d | VP0 |     | VC1 |
| e | VP1 |     | VC2 |
| f | VP2 |     | VC1 |
| g | VP3 | VC2 |     |
| h | VP0 | VC2 |     |

CELL TIME POINTER → b

FIG. 6

ABR TABLE-VP1

| ABR HEAD POINTER | ABR TAIL POINTER |
|---|---|
| H1 | T1 |
| H5 | T5 |
| • | • |
| • | • |

CURRENT POINTER P1 → (H1, T1)

*FIG. 7A*

ABR TABLE-VP2

| ABR HEAD POINTER | ABR TAIL POINTER |
|---|---|
| H2 | T2 |
| H6 | T6 |
| H9 | T9 |
| • | • |

CURRENT POINTER P2 → (H6, T6)

*FIG. 7B*

ABR TABLE-VP3

| ABR HEAD POINTER | ABR TAIL POINTER |
|---|---|
| H3 | T3 |
| H7 | T7 |
| • | • |
| • | • |

CURRENT POINTER P3 → (H3, T3)

*FIG. 7C*

ABR TABLE-VP0

| ABR HEAD POINTER | ABR TAIL POINTER |
|---|---|
| H4 | T4 |
| H8 | T8 |
| • | • |
| • | • |

CURRENT POINTER P0 → (H4, T4)

*FIG. 7D*

HIERARCHICAL SCHEDULES FOR DIFFERENT ATM TRAFFIC

TECHNICAL FIELD

The present invention relates to techniques and devices for scheduling asynchronous transfer mode (ATM) traffic, for different bit rate services assigned to virtual circuit connections within a plurality of virtual path connections, for transmission over an ATM link.

BACKGROUND ART

Modern society is increasingly dependent on the ability to communicate information. More and more applications require communications of varying quantities of information between users. The trend in communications technology is to develop packet or cell based systems for communications transport and switching at ever higher speeds.

Many services having different requirements drove the development of separate networks. For example, analog voice telephone services utilize a complex network of voice traffic switches, lines and trunks to provide ubiquitous switched voice connectivity virtually throughout the world. The modern telephone network carries most voice traffic in digitized form, typically using time division multiplexing techniques. The switched voice network can carry some data traffic, using modems of ISDN interfaces. However, the telephone network cannot readily switch higher speed data traffic, therefore a variety of separate data networks evolved. Examples of such data networks include X.25, frame relay and SMDS. The construction, operation, maintenance and upgrading of such disparate networks for different services are increasingly complex and expensive, particularly as traffic demands continue to increase.

Asynchronous transfer mode (ATM) transport, an advanced, high-speed packet switching technology, has emerged as the latest form of packet or cell based switching. ATM promises fast cell switching for wide ranges of traffic demands. In ATM, information is organized into cells having a fixed length and format. Each cell includes a header, primarily for identifying cells relating to the same virtual connection, and an information field or "payload".

The ATM standard defines a cell size of 53 bytes or octets. The first five bytes of each cell form a header, and the remaining 48 bytes represent payload data. The header of each cell includes a field for a virtual path identifier (VPI) and a Virtual circuit identifier (VCI), to identify the particular communication to which each cell relates.

ATM is intended to carry virtually any type of information that can be expressed in or converted to digital form, from voice telephone traffic, to real-time video, to high-speed file transfers, to faster than real-time video, etc. ATM based networks are eliminating the need for different networks to carry different types of traffic. In ATM, transfer is asynchronous in the sense that the recurrence of cells that contain information from any particular sender is not necessarily periodic. Each device using the ATM network submits a cell for transfer when it has a cell to send, not when they have an assigned or available transmission time slot. Once scheduled and aggregated, the ATM cells ride in synchronous slots on a high-speed media, such as a SONET optical fiber. ATM allows any arbitrary information transfer rate up to the maximum supported by the ATM network, simply by transmitting cells more often as more bandwidth is needed.

Different types of communication require different transport rates. Also, different communications require different levels of service quality, referred to as quality of service or QoS. For example, real-time video transmission requires a high constant bit rate to maintain synchronism, whereas packet data communications do not.

Although the ATM standard specifies both virtual path and virtual circuit switching, devices currently available utilize only virtual circuit connection or VCC based routing. For example, a user network interface (UNI) is known which provides constant bit rate (CBR) and available bit rate (ABR) services using a single virtual path connection (VPC) identifier. CBR service takes precedence over ABR traffic. Each time that there is an opportunity for a CBR circuit to transmit, the interface transmits a cell for that circuit. If the circuit presents no data to send, the interface sends cells from the circuits assigned ABR.

The various circuits are differentiated as different virtual circuit connections (VCCs) having different VCC identifiers, both internally in the interface and in the headers of the transmitted cells. The user network interface runs a VCC based scheduler, to schedule transmission of cells for the various services. To provide CBR service, the scheduler maintains a CBR table. This table includes a VCC identifier for each circuit subscribing to CBR service in the order that service is scheduled for the respective circuits. Constant bit rate service takes precedence over available bit rate service. A table pointer traverses the CBR table at the link cell rate. Each time that the pointer points to a listing in the table that contains the VCC identifier for a circuit subscribing to constant bit rate service, the user network interface will transmit one cell from that circuit. Thus, each CBR circuit receives a percentage of the CBR link bandwidth proportional to the number of listings for the circuit in the table divided by the total number of listings in the table. For example, if VC1 appears in every other slot in the table (half the slots of the table), then the user network interface schedules an opportunity for that VCC to transmit a cell every other cell transmit time. The virtual circuit connection VC1 has the opportunity to use half of the link bandwidth.

Each time that the scheduler within the user network interface accesses a listing or slot in the CBR, the scheduler also accesses the next listing or slot in an ABR table. Thus, when the schedule reads a listing from the CBR table, it also reads a listing from the ABR table. Each listing in the ABR table comprises head and tail link list pointers. These link list pointers point to the beginning and end of a link list of VCC identifiers for circuits subscribing to available bit rate service. The scheduler moves the accessed link list of VCC identifiers to a work list. In this manner, the scheduler accumulates a work list of ABR circuit identifiers as the interface runs through cell times of the ATM link. Whenever a cell transmit opportunity is not used by a constant bit rate service, the scheduler ideally would go through the accumulated work list until it finds a virtual circuit having a cell to send and enables transmission of the cell from that circuit.

The CBR table is static. The ABR table, however, is dynamic. If the processing through the ABR work list enables an ABR service type circuit to actually transmit a cell, then the scheduler removes the served circuit VCC from the work list. This VCC is put back on the ABR table, but at a specifically selected point further down the table. The selection of that point in the table effectively reschedules the service for the sequence of listed ABR circuits. The distance that the listing is moved down the table depends on the type of flow control algorithm in use.

The prior art system assumed all traffic was within one virtual path, for example identified by a virtual path identifier (VPI) of 0. The ATM link may be viewed as a pipe, running from the interface to the next node of the ATM network. The CBR and ABR table approach provides constant bit rate service and available bit rate service, but the use of one VP or VPC for all such services limits the ability to provide such services to a large number of circuits through a single interface. All of the service is within the one pipe defined by the one VPC. The use of a single VPC limits the ability to segregate the bandwidth of the ATM pipe from the user network interface to the next node of the ATM network. The ATM pipe can carry cells from only a certain number of circuits and can support only so many CBR circuits. Also, the interface supports only the two types of services and cannot easily support those services in combination with other services, such as variable bit rate (VBR).

DISCLOSURE OF THE INVENTION

The present invention solves the above discussed problem with the prior art by scheduling ATM cell transport over a link using both virtual path connections and virtual circuit connections. The hierarchical scheduler in accord with the invention facilitates CBR, VBR and ABR services, within logically separate virtual paths or pipes, carried over the same ATM link.

Thus, in one aspect, the present invention relates to a method of scheduling asynchronous transfer mode (ATM) cell traffic, for transmission over a link in a plurality of cell transmit times. The link supports traffic for a number of virtual path connections, thus each virtual path connection may utilize bandwidth on the link. In each respective cell transmit time, one virtual path connection is identified as having been assigned the respective cell transmit time as its cell transmit opportunity. Each virtual path connection supports high priority traffic, such as constant bit rate traffic or variable bit rate traffic, for a plurality of virtual circuit connections. The ATM processing device performing the scheduling determines if there is a high priority service virtual circuit connection, from among those associated with the identified virtual path connection, that is assigned the respective cell transmit time. If the scheduling device identifies such a virtual circuit connection, then the scheduler provides the opportunity to transmit a cell for that high priority service via the virtual circuit on the link in the respective cell transmit time.

If the high priority service is a CBR service, the virtual circuit connection carries a transmitted cell over the link in the respective cell transmit time. If the service is a variable bit rate service, the scheduler checks whether the circuit is ready to send. If so, the scheduler enables transmission in this cell time.

Typically, during processing for each cell transmit time, the ATM processing device performing the scheduling also identifies at least one virtual circuit connection having available bit rate service. The identified virtual circuit connection(s) is associated with the respective cell transmit time from among a plurality of available bit rate (ABR) service type virtual circuit connections associated with the one virtual path connection. In the preferred implementation, the scheduler retrieves a link list of virtual circuits, and appends identifiers for one or more of the identified virtual circuit connection(s) to an ABR work list. During each respective cell transmit time, if the processing relating to the high priority service did not result in cell transmission in the time slot, the scheduling device initiates transmission for a specific one of the identified ABR virtual circuit connections: For example, the scheduling device may access the ABR work list to identify an ABR virtual circuit connection for which there is a cell to transmit, and the cell for that circuit is transmitted over the link in the respective cell transmit time.

The present invention also encompasses ATM processing devices that incorporate elements for performing the scheduling operation described above.

For example, in one embodiment, the invention encompasses an ATM processing device, including a media access control interface. Data relating to a plurality of data communication services is received through this interface from one or more data devices. A segmentation processor segments the data received via the media access control interface and adapts the segmented data into ATM cells. The ATM processing device also includes a link interface for transmitting the ATM cells over a link to a node of an ATM network. A programmable cell transmission scheduler controls the scheduling of cells for transmission over the link, for each of the data communication services. A scheduling table is stored in memory, for use by the programmable cell transmission scheduler. The scheduling table includes a plurality of lines, each of which contains an index identifying one of a plurality of virtual path connections that may utilize the link. A field in each line may contain an identifier of a high priority service virtual circuit connection. In the preferred implementation of this embodiment, each line also includes a field for an identifier of a virtual circuit connection having a somewhat lower priority service, e.g. variable bit rate service. Each line also has a field containing a pointer. The pointer points to a virtual circuit connection link list for one or more low priority services, e.g. connections having available bit rate service.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

FIG. 5 is an example of a first implementation of a scheduling table useful in the present invention.

FIG. 6 illustrates a static scheduling table used in a second embodiment of the invention.

FIGS. 7A to 7D depict simplified portions of dynamic scheduling tables used for scheduling ABR type ATM cell transmission in accord with the second embodiment of the present invention.

BEST MODE FOR CARRYING OUT THE INVENTION

Figure 1A:
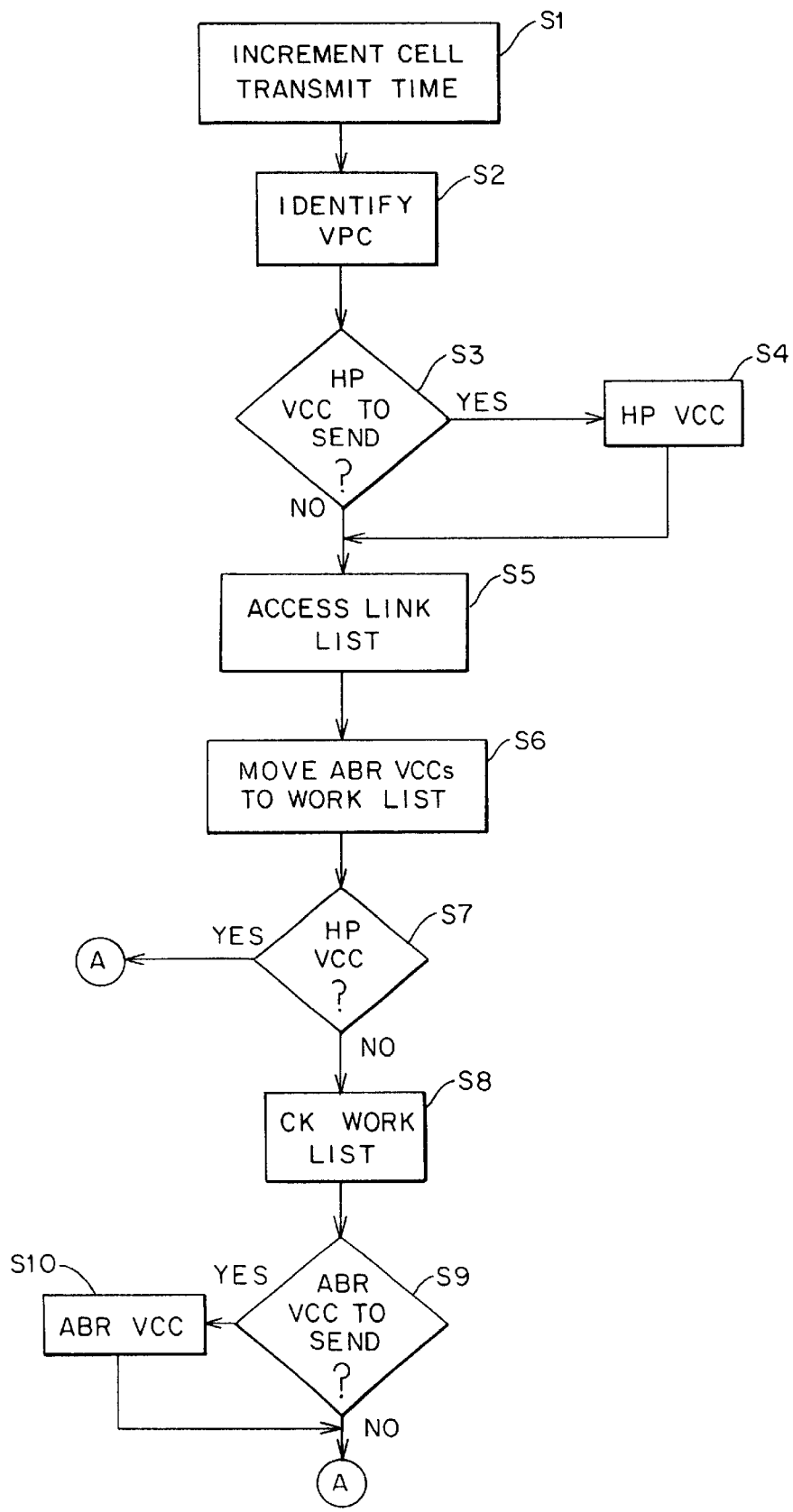
FIGS. 1A and 1B together form a high level flow diagram of ATM cell transmission scheduling in accord with the present invention.
Figure 1B:
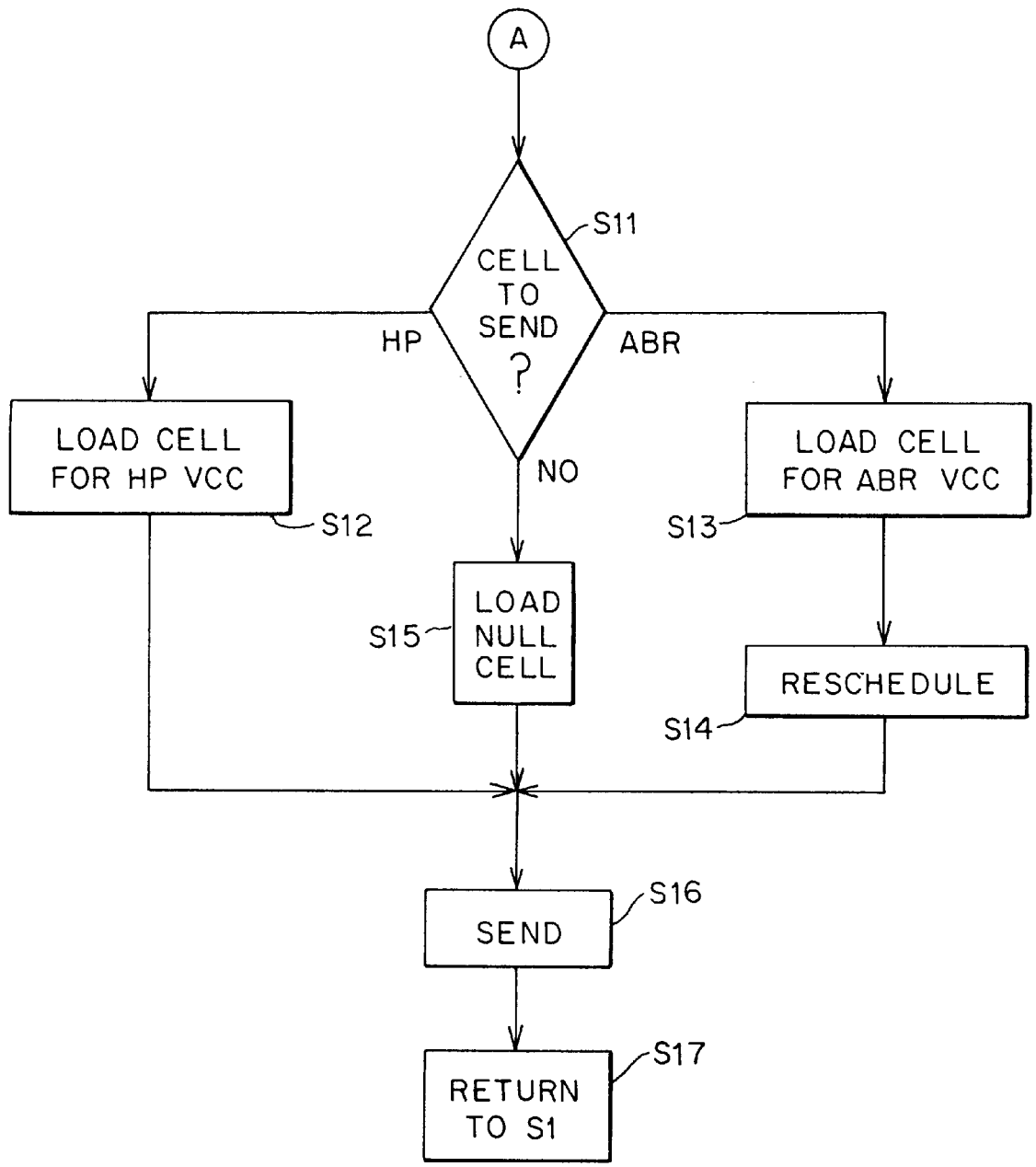

The present invention enables the scheduling of asynchronous transfer mode (ATM) cell traffic for transmission over a link. ATM transport devices operating in accord with the present invention incorporate a traffic scheduler which segregates traffic on the link into a plurality of virtual path connections, and within each virtual path, the scheduler segregates traffic into a plurality of virtual circuit connections. The scheduler utilizes one or more tables to assign traffic of a variety of types into respective cell transmit time slots. FIGS. 1A and 1B form a simplified flow chart illustration of the schedule processing of the present invention.

The scheduler increments cell transmit time (step S1). A key feature of the present invention relates to use of multiple virtual path connections (VPCs). For each respective cell transmit time, the scheduler therefore identifies one virtual path connection that is assigned to the cell transmit time (step S2). The division of the ATM link into separate virtual paths (VPs) using multiple virtual path identifiers (VPIs) and assigning time slots to the VPCs allows the division of traffic on the link into several logical paths or pipes. The overall (physical) link then can support CBR traffic and ABR traffic within each logical pipe. The new system also supports variable bit rate (VBR) traffic.

The scheduler supports high priority services, such as CBR service, for a number of virtual circuit connections (VCCs) within each virtual path connection (VPC). The scheduler therefore determines if there is a high priority VCC, associated with the identified VPC, for which there is a cell to send (step S3). If there is no cell ready to send for this CBR, the opportunity is passed to low priority VCC associated with this VPC. For a variable bit rate (VBR) service type circuit, the scheduler will identify the VCC and will check to see if there is a cell from the source device ready for transmission over that VCC. If there is a high priority cell to send, the scheduler registers the VCC identifier for that high priority circuit and sets an appropriate status bit (step S4), and processing flows to step S5. If there is no high priority circuit with a cell to send in the present transmit opportunity, then the schedule processing advances directly from step S3 to step S5. If steps S3, S4 identified a high priority VCC having a cell to transmit, then the scheduler will initiate transmission of the cell for that virtual circuit connection at the end of one cycle through the process flow (in step S16), as discussed more below.

In step S5, the scheduler accesses a link list. The link list is one associated with the VPC identified in step S2. The link list identifies one or more virtual circuit connections having available bit rate service (ABR) whose service time is due. Each virtual path connection (VPC) supports ABR services for multiple virtual circuit connections (VCCs). As discussed more below, the preferred embodiments utilize one or more tables to associate the ABR VCCs with their respective VPCs and with cell transmit time opportunities.

The scheduler may transfer all of the VCCs from the one accessed link list to a work list, or the scheduler may check the status of the circuits on the link list and transfer only the VCC identifiers for those ABR circuits with a cell ready to send from the accessed link list to the work list (step S6). Over a series of cell transmit times, the scheduler will transfer individual VCC identifiers from a number of link lists associated with a number of VPCs to build up one or more work lists of ABR circuits awaiting an available slot in which to transmit a cell. Thus, during any cell transmit time for which the scheduler has no higher priority cell scheduled, it then fetches the ABR VCC from the head of the work list for the VPC. If this ABR VCC has a cell to send, the cell is sent over the link. Otherwise, a null cell is sent over the link. In the simplified flow diagram illustrated in FIG. 1A, this is implemented through a check of the ready status for the high priority circuits (step S7) followed by work list processing (steps S8–S10).

If the scheduler found a VCC with a high priority (HP) cell to send, step S7 branches to step S11. However, if the scheduler has found no high priority VCC with a cell to transmit, process flow branches from step S7 to step S8. At this point, the scheduler checks the work list to set the ABR VCC from the head of the work list. If this VCC has a cell awaiting transmission, processing flows through step S9 to step S10, in which the scheduler registers the VCC identifier for that ABR service circuit and sets an appropriate status signal. If this VCC has no cell ready to transmit or the work list is empty, step S9 branches the process flow to bypass step S10.

In step S11 the scheduler determines which cell to send. If there is a high priority circuit for which there is a cell ready to send, processing branches to step S12 in which the scheduler loads the cell from the source to the ATM transmitter. If there is an ABR type circuit for which there is a cell ready to send, processing branches to step S13 in which the scheduler loads the cell from the particular ABR source to the ATM transmitter. In step S14, the scheduler moves the identifier for the ABR type VCC granted the transmit opportunity from the work list. If a null cell is sent for this VCC, this VCC is not put back to the schedule table. Otherwise, this VCC is rescheduled to a new location for future processing, as will be discussed in more detail with regard to the preferred embodiments. If there was no high priority circuit and no ABR circuit with a cell ready to send, processing branches to step S15 in which the scheduler loads a null cell to the ATM transmitter.

In step S16, the scheduler causes the ATM transmitter to send the loaded cell. Thus, if the high priority processing identified a VCC with a right to transmit during this cell transmit time and having a cell ready to transmit (S3, S4), then the scheduler loaded a cell for that CBR type VCC (S12). The ATM transmitter sends the cell over the VCC on the link having the high priority service in step S16. Alternatively if the work list process identified an ABR type VCC with a cell ready to send (S8, S10), then the scheduler loaded a cell from that ABR type VCC (S13), and the ATM transmitter sends the ABR service cell over that VCC on the link in step S16. If processing did not identify either a high priority VCC or an ABR VCC with a cell to send, then the scheduler loaded a null cell (S15), and the transmitter sends the null cell over the link in step S16. It should be noted that the cells are transmitted on the identified virtual path connection (VPC) on the link. In ATM, virtual path connections and virtual circuit connections are made up of cells in the transmit stream that contain the VPIs and VCIs of those connections in the headers of the actual cells.

After transmission, processing returns through step S17 to step S1, where the scheduler increments the cell transmit time. The scheduler will go through the process again, but in a typical sequence, the next pass through the scheduler process will identify a different VPC and a VCC within that VPC. In this manner, repeated flow through the process will allocate cell transmit time slots to a variety of high priority and available bit rate services within the different VPCs. The hierarchical scheduler therefore supports different types of traffic within each logical path or pipe identified as a VPC.

The above-discussed operations are examples of typical operations. The traffic scheduling principles of the invention may facilitate other types of ABR processing. For example, if the scheduler selects a VCC from a link list only if the circuit has a cell to send, in a time slot in which there is no high priority service scheduled and the work list is otherwise empty, the scheduler can enable transmission over the circuit identified from the link list without moving the VCC to the work list.

The ATM traffic scheduling of the present invention may apply in a variety of ATM processing devices, such as ATM edge devices and other ATM routers and/or switches. The preferred implementation of the present invention applies the scheduling principles in a segmentation and reassembly circuit, typically used in an ATM user network interface (UNI). A high level functional description of a network and a UNI containing the scheduler is presented followed by a discussion of the preferred embodiments of the scheduling process implemented in the segmentation and reassembly circuit.

Figure 2:
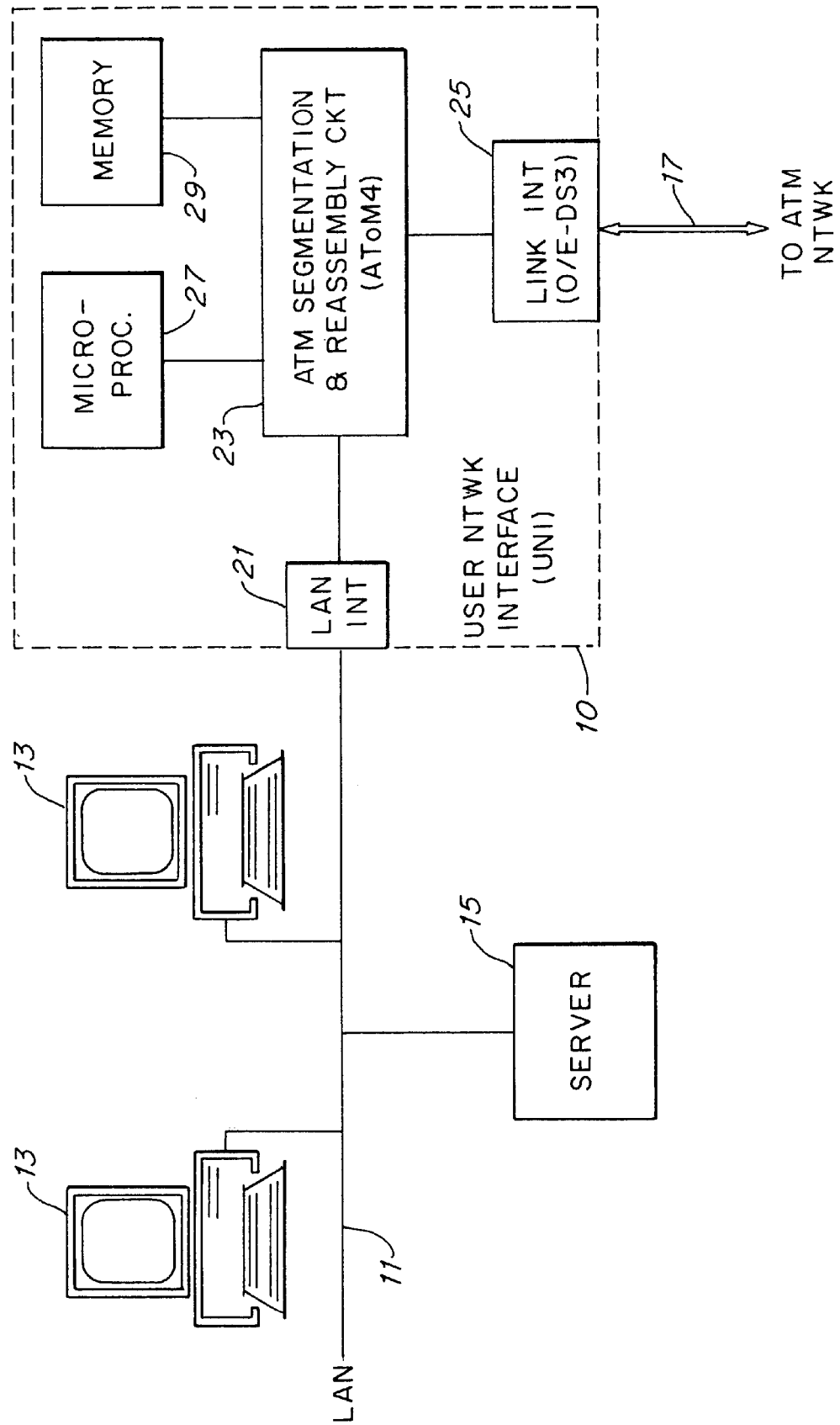
FIG. 2 is a block diagram of a data communication system including an ATM segmentation and reassembly circuit, performing ATM cell transmission in accord with the present invention.

FIG. 2 illustrates a user network interface (UNI) 10 providing a two-way data communication connection between a local area network (LAN) 11 and a high speed ATM link 17. The ATM link 17 typically connects to a switch or router of an ATM network. The LAN 11 provides data communications between various data devices connected thereto. In the simple example illustrated, the LAN 11 connects to a plurality of PCs 13 and to one or more servers 15. The UNI 10 and the connection thereof through the LAN 11 enables the PCs 13 and/or the server 15 to send and receive data communications over assigned virtual circuits on the ATM link 17. As discussed in more detail later, the segmentation and reassembly circuit 23 assigns virtual channel connections (VCCs) to data communication services from the PCs 13 and the server 15 and schedules transmissions depending on the types of service and bandwidths allocated to each of those data devices.

The ATM segmentation and reassembly circuit 23 controls the data flow between the cell based virtual circuits assigned on the ATM link and the packet based virtual circuits through the LAN 11 to the data devices 13, 15. The circuit 23 segments and adapts outgoing data for ATM transport and schedules transmission in assigned virtual paths and circuits. As part of this operation, the circuit 23 inserts VPIs and VCIs in the cell headers to logically place cells in the virtual paths and circuits. The circuit 23 also reassembles payload data from ATM ells into packets for transport to the data devices. The circuit 23 performs all necessary address administration in both directions.

Operations of the ATM segmentation and reassembly circuit 23 are controlled by a microprocessor 27. The microprocessor 27 serves as the node control processor for the UNI 10, for example to administer service negotiation. The ATM segmentation and reassembly circuit 23 also connects to a memory 29, such as a static random access memory (SRAM). The circuit 23 stores scheduling tables, link lists and work lists in the memory 29. Assembled outgoing cells containing segmented data and VPI/VCI values are buffered and queued in the memory.

The LAN 11 carries data communications in some standard type of packet data protocol, such as Ethernet. The packets include media access control layer addressing information, to facilitate two-way communication over the LAN. The UNI 10 includes a LAN interface 10 for physical connection to the LAN 11 and for conforming information going to and from the UNI 10 to the particular LAN protocol. The LAN interface provides a two-way MAC level connection or interface to the ATM segmentation and reassembly circuit 23.

The link 17 carries ATM cells in some high speed transport format. For example, the link may be a DS3 communication channel on electrical cable or an OC-1 or OC-3 on optical fibers. The ATM segmentation and reassembly circuit 23 connects through its physical interface port to a link interface 25. The link interface 25 conforms the ATM cell information going to and from the UNI 10 to the signal type (electrical or optical) and the protocol (DS or SONET) of the link 17. The DS and OC protocols cited are examples only, and if other high speed protocol links are used, an appropriate interface 25 would couple the UNI to the particular link and perform the necessary interface of the UNI to the link.

One example of a chip capable of serving as the circuit 23 is AToM4 manufactured by Digital Equipment Corporation and Toshiba Corporation. In the outgoing direction, the ATM segmentation and reassembly circuit 23 adapts information from LAN packets for ATM cell transport. The circuit 23 also maps packet address information into virtual path and circuit identifiers, in order to transmit cells for particular devices or services in assigned virtual circuits over the ATM link 17.

Figure 3:
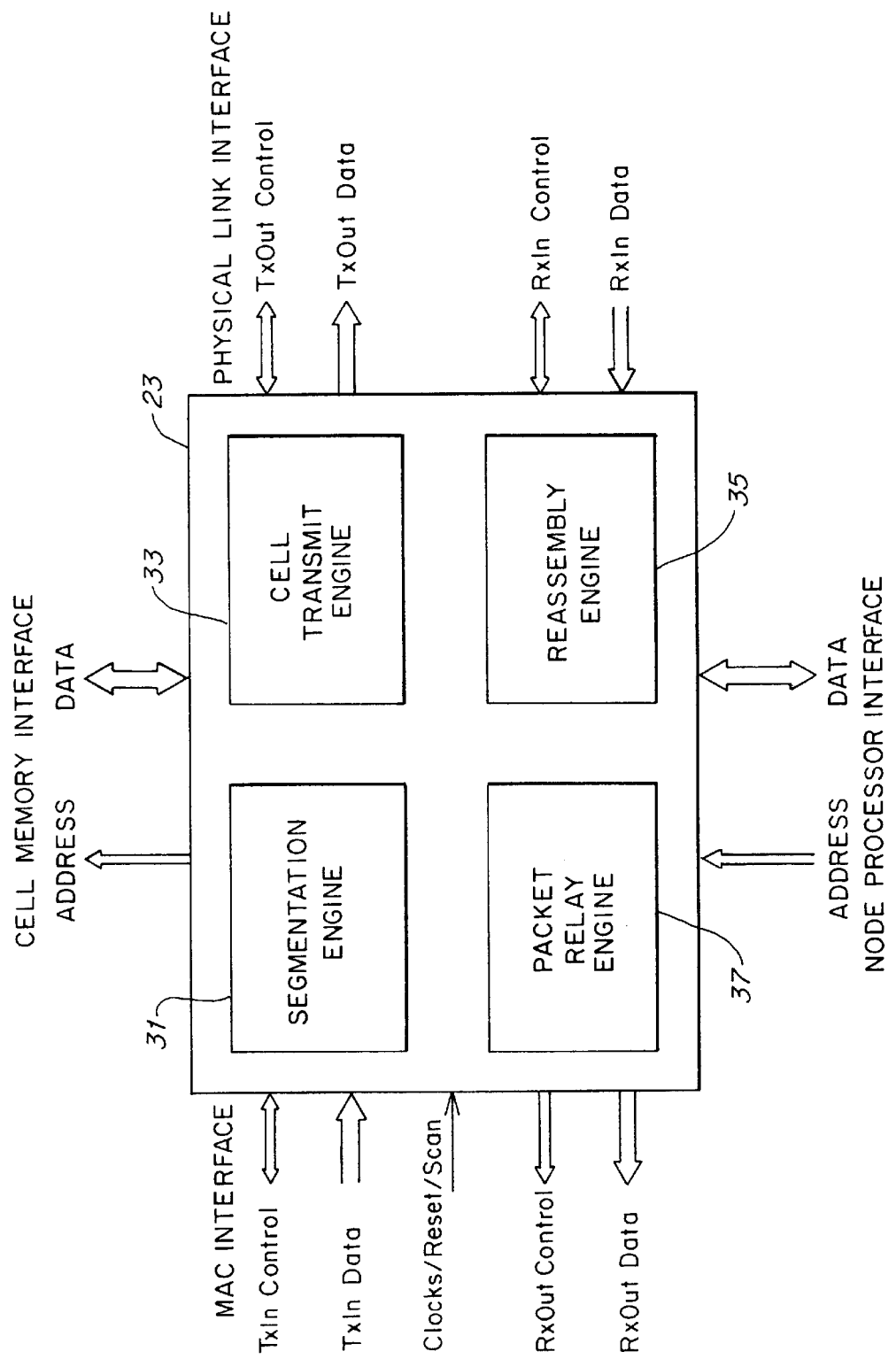
FIG. 3 is a high level block diagram of the ATM segmentation and reassembly circuit.

FIG. 3 is a high level functional block diagram of the ATM segmentation and reassembly circuit 23. The circuit 23 provides the functions required to implement a variety of high-performance ATM User Network Interfaces. This includes packet stream to circuit selection, ATM Adaptation Layer (AAL), segmentation and reassembly (SAR), and cyclic redundancy (CRC) generation and checking. The circuit 23 contains mechanisms to support traffic shaping, varieties of ATM flow control protocols, and Operations Administration and Maintenance (OAM) flows. The ATM segmentation and reassembly circuit 23 interfaces with a variety of physical layer chips by Utopia or specific interfaces to facilitate media interface connection to DS3, E3, and HSSI links.

The circuit 23 receives packets from the LAN interface 21 or the like for transmission on the ATM link 17 via a byte-wide data interface with one parity bit (TxInData) that runs at 12.5 MHz or 25 MHz. The control interface (TxIn Control) includes packet delineation and byte flow control. The flow control signal is used to hold off transmission of data during periods where no buffers are available for the data to be transmitted. The receive portion of the packet interface is also byte wide for data with one parity bit (RxOut Data), and runs at the same speed as the transmit interface. There is a separate control channel (RxOut Control), which indicates receive packet delineation and error status.

The segmentation and reassembly circuit 23 connects to the actual link interface 25 through a physical link interface or port. The physical link interface consists of a byte-wide data path for both transmit (TxOut Data) and receive (RxIn Data). In all modes, the link interface is slaved from the link clock inputs. Speed matching FIFOs are used between clock boundaries. Byte transmission/reception to/from the link is controlled by either a gapped link clock or an overhead/valid indication signal on the control lines.

The cell memory interface consists of a 64-bit data bus (Cell Memory Data), with two additional parity bits and a 20-bit address bus (Cell Memory Address). Write enable and output enable signals are provided separately. The preferred embodiment of the ATM segmentation and reassembly circuit 23 is capable of addressing up to 1 Meg word (8Mbytes) of memory. The external memory is used for storing ATM cells that are awaiting transmission or are being reassembled, records, traffic schedules and free buffer pools. The amount of memory required depends on the number of circuits being used in a particular application. Currently, 1 MB of memory is used to support 4096 circuits.

The segmentation and reassembly circuit 23 connects to the microprocessor 27 through a node processor interface or port. The node processor interface uses a 16-bit data and 7-bit address configuration. This port uses a synchronous Motorola 68K style interface, running at 12.5 or 25 MHz. All of the chip control and status registers (CSRs) can be accessed directly through this interface. The external memory 29 also is accessed indirectly through this interface.

Figure 4:
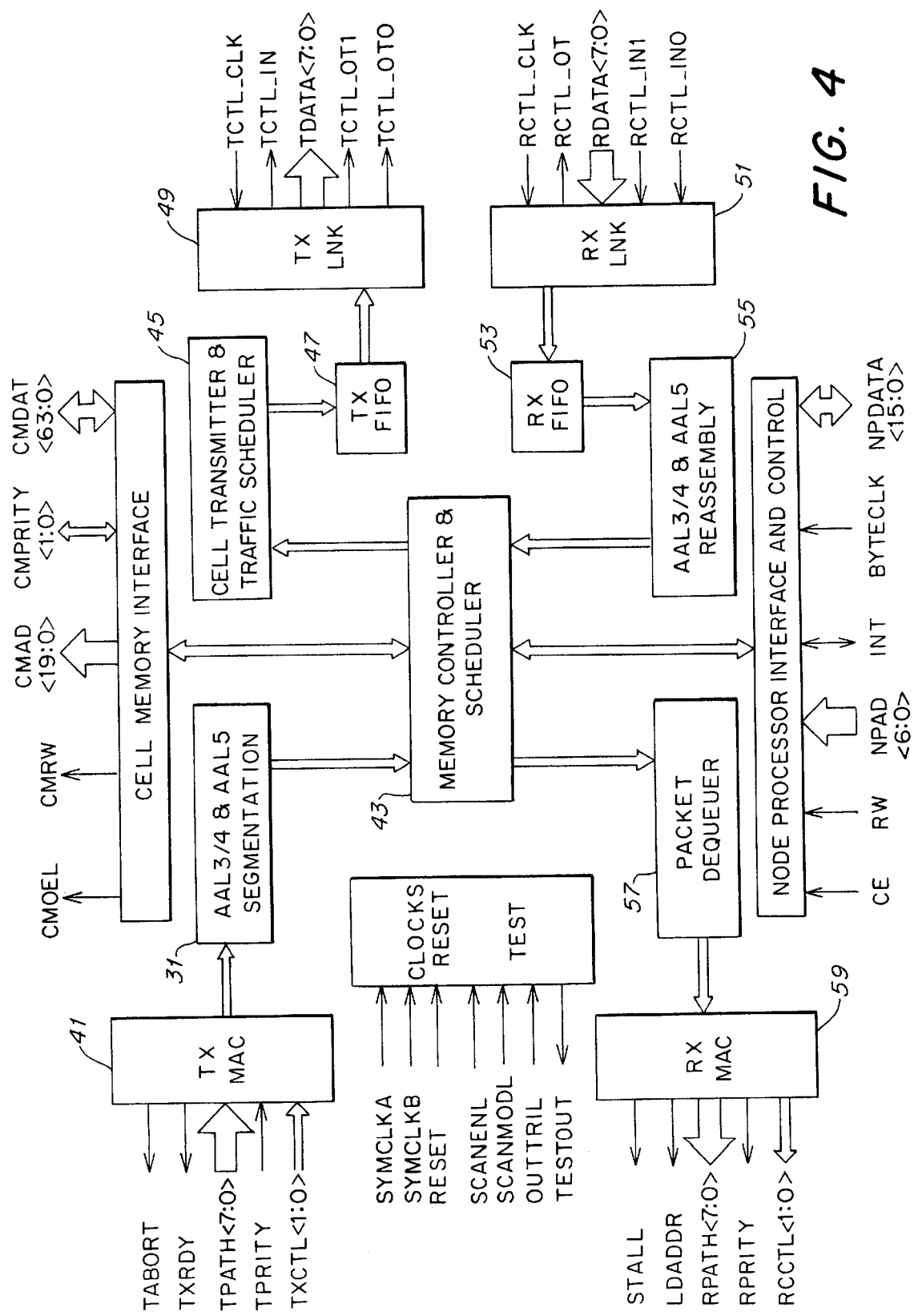
FIG. 4 is a more detailed block diagram of the ATM segmentation and reassembly circuit.

As shown in high level form in FIG. 3, the segmentation and reassembly circuit essentially comprises four processing engines, a segmentation engine 31, a cell transmit engine 33, a reassembly engine 35 and a packet relay engine 37. FIG. 4 shows the elements of the segmentation and reassembly circuit 23 in somewhat more detail.

As shown in FIG. 4, the segmentation engine 31 receives packets from a transmit MAC interface 41. The segmentation engine 31 segments packets into either AAL3/4 or AAL5 cells according to the virtual circuit state that is set up for each packet. At the start of a packet, the segmentation engine 31 uses a region of the header to identify the particular ATM circuit that the cells should be queued on. Each ATM virtual circuit is identified with one of several virtual path connections (VPCs) and with a specific virtual circuit connection (VCC) within the particular VPC. Up to 4095 separate circuit queues are supported. The region of the header used is programmable and depends on the packet format, e.g., the format used on the LAN 11 in the example in FIG. 2.

The segmentation engine 31 supplies the cells to a memory controller and scheduler 43. The controller and scheduler 43 stores the cells resulting from the segmentation in external SRAM (memory 29) for transmission by the cell transmit engine 33. In the simplified embodiment illustrated (FIG. 4), the transmit engine 33 includes a cell transmitter and scheduler 45 and transmit FIFO buffers 47 which connect to the transmit link portion 49 of the physical link interface port. Transmission of a cell segmented from a packet can occur while the rest of the packet is still being segmented and hence transmit "cut through" is supported.

The cell transmit engine 33 services up to 4095 transmit queues for CBR, VBR, ABR and UBR traffic. CBR and VBR traffic is served according to a precomputed traffic schedule that is stored in external SRAM, using one or more schedule tables in accord with the invention. This schedule table(s) can be used for peak-rate traffic shaping on a per circuit basis. The manner in which this table is filled out can also allow prioritization of traffic and overbooking of bandwidth. The granularity of bandwidth assigned to circuits is programmable by appropriate programming of the table(s).

A speed-matching FIFO 47 exists in the cell transmit engine 33 to account for the different clock speeds used for the core process (25 MHz) and the link process (0–25 MHz). The cells are simply output as a stream, e.g., for an STS-3c link. The byte stream output can be held off by either gapping the link clock or asserting the overhead indication signals.

The reassembly engine 35 receives cells through a receive portion 51 of the physical link interface. This engine 35 includes a FIFO 53 and a reassembly section 55. The reassembly engine 35 receives cells in byte-wide format from the link. The FIFO 53 provides speed matching between the link clock domain (0–25 MHz) and the core process clock domain (25 MHz).

Packet reassembly in section 55 begins by taking a cell from the FIFO 53 and looking up the receive circuit state that is stored in external SRAM (memory 29). The index to the receive circuit state table is based on individual lookups of the VPI field, the VCI field, and possibly, the MID field if AAL4 is being used. If the circuit lookup indicates that the cell should be accepted, the cell is written to a free cell buffer in external memory 29. If a packet reassembly is completed by the addition of this cell, the list of cells comprising the packet is moved to one of two packet lists, depending on priority bit setting for this circuit, and the circuit state is cleared. Otherwise, the circuit state is updated and written back to memory. Full AAL5 or AAL3/4 checking is done, including CRC checking, length field checking, segment type checking, and sequence number checking.

The packet relay engine 37 comprises a packet dequeuer 57. The packet relay engine 37 services two prioritized queues each of which contains a list of cell buffers that represents reassembled packets. The reassembly engine places reassembled packets into this queue and indicates to the packet relay engine when a packet is ready for servicing. Each packet contains a pointer to the circuit that it was received on. The packet relay engine 37 provides the MAC destination address in the header of the reassembled packet. The packet header and the complete packet are passed to the MAC interface 7. The RxOut MAC interface 59 uses the MAC protocol to deliver packets. This protocol delineates the packets with start and end markers and it indicates the status of the packet, e.g., good or bad CRC. In the illustrated example (FIG. 2), the receive MAC interface 59 supplies the reassembled packet to the LAN interface 21 for transmission over the LAN 11 to the destination device 13 or 15.

The above description of general transmit and receive operations of the ATM segmentation and reassembly circuit 23 is provided for understanding the context of the preferred implementation of the present invention. In accord with the invention, the scheduler associated with the cell transmitter 45 schedules a variety of different types of traffic on a hierarchical basis for a plurality of virtual paths within the ATM link. That scheduler implements a process similar to that of FIG. 1 using one or more scheduling tables. Further discussions will concentrate on hierarchical scheduling using two implementations of the scheduling table(s).

FIG. 5 depicts a simplified example of a first table embodiment, i.e. a single scheduling table, used in the hierarchical scheduler. The scheduling table includes multiple lines indexed by cell transmit time. The first field in each line contains an identifier or index for one of the VPCs. The VPC index in a line effectively assigns the cell transmit time of that line to the indexed VPC.

The next two fields in each line identify VCCs for different levels of service priority, and the succeeding two fields point to lists of additional VCCs having a different type or level of service. The VC or VCC identifiers used in this table (and other tables discussed later) may take the form of internal numbers or names arbitrarily assigned as the identifiers. In such a case, the segmentation and reassembly circuit 23 will translate those identifiers into actual ATM standard virtual circuit identifiers (VCIs) for insertion into the cells transmitted over the ATM link by the interface chip. Alternatively, the segmentation and reassembly chip 23 may utilize ATM VCIs as the internal virtual circuit identifiers.

Returning to FIG. 5, the next field in each line contains an identifier for a VCC having a high priority service. The high priority service may be a VBR service, but typically the high priority service is a CBR service. The next field in the table contains an identifier for a VCC having a low priority service. Here, low priority means that the service is lower in priority than the service (if any) identified in the high priority field. In preferred implementations, the high priority service is CBR service, and the low priority service is VBR service. As discussed more below, other services, such as ABR traffic, actually have still lower priority than those identified in the 'low priority' field.

In operation, the scheduler traverses the table as it increments the cell transmit time. The order of accessing the lines of the schedule table is a-b-c-d-e-f-g-h-a . . . which are stored in 'next serve time' in the field in each line. For each cell transmit time, the scheduler accesses one line in the table to perform a variety of scheduling functions. If the scheduler finds a CBR VCC in the high priority column and it has a cell ready to transmit, the scheduler initiates transmission of a cell over that VCC. If not, the scheduler looks to the low-priority column. If the line identifies a VCC for low priority service, the scheduler checks the cell queue in memory 29 holds a cell that is ready for transmission over that VCC. If so, then the scheduler initiates transmission of a cell for that VCC. If not, the scheduler offers the cell transmit opportunity to VCCs having lower priority services.

For each cell transmit time, the scheduler also uses information from each line to schedule ABR services. In the single table implementation, each line specifies a pair of pointers for ABR service The head and tail pointers enable the scheduler to select a link list of VCCs associated with the VPC indexed in the particular line. The link list includes VCC identifiers for associated circuits carrying available bit rate service type traffic. The scheduler accesses the identified link list and appends VCCs from the link list to a work list. The scheduler may append all of the VCC identifiers from the link list to the work list. Alternatively, the scheduler may append VCC identifiers only for the circuits on the link list that have a cell ready to transmit. In the single table implementation, there could be one work list for all VPCs, but preferably the scheduler uses a separate work list for the ABR traffic for each VPC. Thus, the scheduler will append the VCCs from a particular link list to the work list associated with the indexed VPC. When the scheduler detects a cell transmit time for which there is no CBR or VBR service cell to transmit, the scheduler selects the VCC from the head of its work list.

Consider scheduling for several VCCs as simplified examples using the illustrated table. In cell time a, the scheduler accesses the first line in the table. Based on that line, the scheduler identifies VP1 as the VPC assigned this time slot. The scheduler checks the high priority field of the first line. Different VPCs may use the same VCC identifiers, but each combination of a VPC identifier and a VCC identifier uniquely identifies one circuit. In the present example, the high priority field of the line for time a includes a VC1 identifier. This is a VCC associated with VP1 having a high priority of service. Assuming the high priority service is a CBR service and this VCC has a cell ready to transmit, the scheduler causes transmission of a cell for the VP1 circuit VC1 in the present time slot. The cell transmitted includes VPI and VCI values corresponding to VP1 and VC1. During the processing for transmit time a, the scheduler will also use head and tail pointers H1, T1 to access a link list and move VCCs from that list to an ABR work list associated with VP1, as discussed above.

In the illustrated example, there are four VPCs (VP1 to VP0) each having one-fourth of the link rate assigned as their respective bandwidth. To implement this allocation, each VPC has its identifier listed in one-fourth of the lines of the table. In the present example, the scheduler will run through similar processes for VP2, VP3 and VP0 for time slots b, c and d respectively. In the illustrated example, each VPC identifier appears in the line corresponding to every fourth cell transmit time, e.g. VP1 appears in lines a and e. When cell transmit time e occurs, the scheduler accesses the corresponding line in the table. Based on that line, the scheduler identifies VP1 as the VPC assigned this time slot. The scheduler checks the high priority field of the first line. In this example, there is no CBR service VCC listed.

The scheduler next checks the low priority field. In this example, that field identifies VC2. Here, VC2 is a different VCC associated with VP1. The low priority service preferably is a variable bit rate service. The scheduler checks to determine if this VC2 has a cell ready for transmission. If VC2 has a cell ready to transmit, the scheduler causes transmission of that cell in the time slot e. The header of the transmitted cell contains a VPI corresponding to VP1 and a VCI corresponding to VC2. During the processing for transmit time e, the scheduler will also use head and tail pointers H5, T5 to access a link list and move VCCs from that list to an ABR work list associated with VP1 as in the earlier examples.

Assume now that in time e there was no cell ready to transmit over circuit VC2 for VP1. In such a case, the scheduler goes to the work list for VP1 to find an ABR circuit with a cell to transmit. Assuming that the scheduler finds the VCC at the head of the work list with a cell that is ready to transmit, the scheduler causes transmission of a cell over that VCC in the time slot.

The scheduler indexes the table at the cell rate of the link. The scheduler executes the hierarchical scheduling process for each line of the table. The execution order of all lines in the table is determined by the contents in the 'Next serve time' field of the table. For the example shown in FIG. 5, the execution order is from time slot a to time slot b, from b to c, from c to d, from d to e, from e to f, from f to g, from g to h, from h back to a. In this fashion, the scheduler repeatedly cycles through the table to present transmit opportunities for specific circuits identified in the table and in the ABR work lists.

The listing of the VCCs in the high and low priority columns of the tables allocate transmit opportunity and bandwidth to those services. Constant bit rate service is provided by entries in the high priority fields of the table, and the number of entries in those fields determines the bandwidth within the VPC allocated to the particular VCC for its CBR service. In the above example, VC1 for VP1 appeared only in the high priority column. That VCC receives CBR service because the table guarantees that circuit an opportunity to transmit each time that cell transmit time a occurs.

Similarly VC2 for VP1 appeared in the low priority column in a line which included no higher priority entry. That entry guarantees VC2 an opportunity to transmit each time that cell transmit time e occurs. If the VCC circuit uses the opportunity every time, it receives its maximum allowable cell transmission rate. However, at times this VCC may not have a cell that is ready to transmit. If the VCC does not transmit in that slot, its transmission rate decreases, and the transmit opportunity passes to the still lower priority ABR service VCCs.

The table structure also supports a combination of CBR and VBR services for a given circuit, effectively to provide such a circuit with a variable rate service having a guaranteed minimum transmission rate. If a circuit, such as VC2 for VP3, has one or more entries in the high priority column, those entries guarantee a minimum bit rate, essentially as a CBR service (see the line for time slot g). The appearance of the same VCC in the low priority (e.g. in the line for cell time c) provides an added variable rate opportunity that the circuit need not always use.

If an ABR VCC is served and this ABR needs more service, this ABR is then rescheduled to a future time slot belonging to its VPC. For this purpose, the scheduler inserts this VCC into a slot, which is down the table by the amount Δt, and this slot must be associated with the same VPC. If the slot in the table indexed by Δt does not belong to the same VPC, the scheduler will then keep on searching the table until the same VPC is found down the table. 'Δt' is computed from this ABR current service cell rate.

This form of rescheduling for ABR service is complex. Sometimes, it is not feasible due to the depth of searching for the same VPC. Also, any change in bandwidth allocation requires redoing all of the table entries, which makes dynamic bandwidth allocation very difficult.

To provide a more flexible scheduling for ABR service and easier rescheduling, the second embodiment of the scheduling process uses separate tables for ABR traffic. Specifically, one static table indexes VPCs and identifies high and low priority VCCs for CBR and VBR traffic. There is a separate, dynamic ABR table associated with each respective VPC. When the scheduler accesses a line of the static table for a given cell transmit time it first identifies a VPC assigned that slot for its use. The scheduler processes CBR and VBR traffic using VCC identifiers from the indexed line of the static table. The scheduler also access a dynamic ABR table for the indexed VPC to retrieve a link list and append that list to a work list associated with the VPC. Moving the pointers for that list down the respective ABR table reschedules service for a specific link list of VCCs by an appropriate number of lines. It should be noted, that with the second implementation, a reallocation of bandwidth between VPCs requires modification of the number of lines each VPC has in the static table. However, the ABR tables require no modification.

Figure 8:
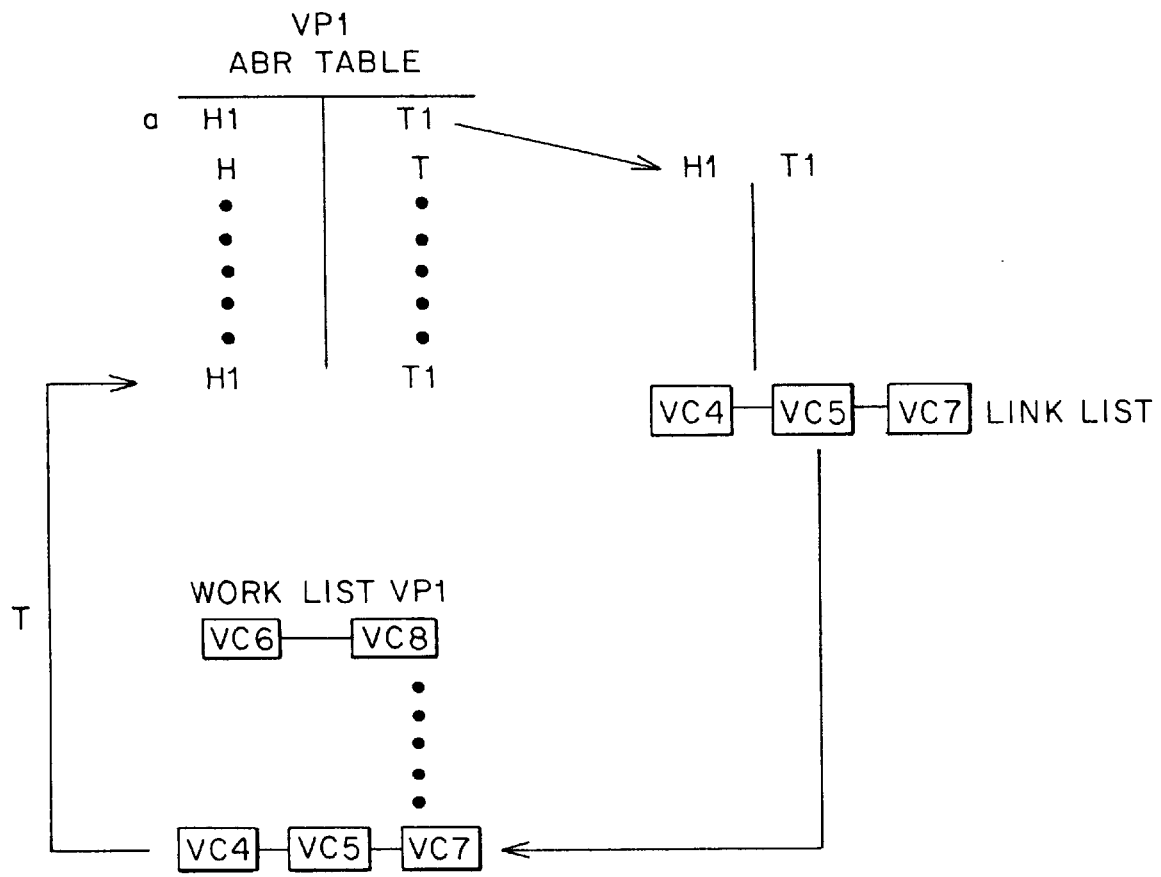
FIG. 8 is a process diagram useful in understanding work list operations for ABR service

FIG. 6 illustrates one example of a static table; and FIGS. 7A to 7D illustrate simplified portions of the dynamic tables, in accord with this second embodiment. FIG. 8 illustrates process flow for an ABR work list, in the second embodiment.

As shown in FIG. 6, the static scheduling table includes multiple lines indexed by cell transmit time. The scheduler traverses the static table at the cell slot time rate of the ATM link, i.e. the pointer for this table moves to the next line each time that the scheduler increments the cell transmit time. Each line of the table corresponds to one cell transmit time slot. Note that the 'next serve time' field does not exist any more. The scheduler traverses the static table by simply incrementing the cell time pointer.

The first field in each line contains an identifier or index for one of the VPCs. The VPC index in a line effectively assigns the cell transmit time of that line to the indexed VPC. In the illustrated example, there are four virtual path connections (VPCs), and the static table includes virtual paths indexes VP1, VP2, VP3 and VP0 for those virtual paths. Each row in the table represents an opportunity for transmission of a cell for the indexed VPC, In the example, each VPC receives a transmit opportunity every fourth time slot. Thus each VPC may use up to 25% of the link bandwidth.

The next field in each line contains an identifier for a VCC having a high priority service. The high priority service may be a VBR service, but again preferably relates to a CBR service. The next field in the table contains an identifier for a VCC having a low priority service. The term 'low priority' only means that the service is lower in priority than the service (if any) identified in the high priority field. Again, other services, such as ABR traffic, actually have lower priority than those identified in the 'low priority' field. The scheduler processes the high and low priority entries in essentially the same manner as in the earlier embodiment.

The scheduler first presents the send opportunity to the VCC (if any) identified in the high priority field. High priority entries in the static table typically are used for CBR services. Each cell time that the scheduler hits a VCC for a CBR service in the high priority field of a line, the scheduler would determine if there is a cell buffered in the memory awaiting transmission over the high priority VCC. If there is no data to send, the VCC having the CBR service still transmits a cell, albeit a cell having the VPI and VCI values assigned to the circuit in the header but having no data in the payload. If the high priority field were used for some service other than CBR, e.g. VBR, then the scheduler would determine if there is a cell buffered in the memory awaiting transmission over the high priority VCC.

The high priority processing often does not cause scheduling of transmission in the respective cell time slot, typically because there is no VCC listed in the high priority field (for CBR), or possibly because a VCC in that field has no cell ready for transmission on that circuit. In any such case, the scheduler passes the cell transmit opportunity to the VCC (if any) identified in the low priority field. The low priority entries typically are used for variable bit rate services. Each cell time that the scheduler hits a VCC for a VBR service in the low priority field of a line, the scheduler offers the cell transmit opportunity to that specific VCC. If the scheduler determines that the identified VCC has a cell buffered in memory and ready to send at the present cell transmit time, then the scheduler will initiate transmission of the cell for that VCC. If not, then the scheduler looks to circuits having still lower priority service, such as available bit rate service, to identify a circuit and a cell to transmit.

As in the earlier embodiment, by placing identifiers for the same VCC in the high priority field and the low priority field, in different lines of the table, the scheduler actually provides a variable bit rate service with a guaranteed minimum bandwidth. If the scheduler finds the VCC in the high-priority field in one line of the table, the scheduler schedules the cell transmission for that VCC during each cell transmit time that indexes that line of the static table, just as if this were a CBR service. The number of lines in the table, which include the VCC identifier in the high priority field, establishes the CBR-like minimum bandwidth. Appearances of the VCC identifier in the low priority field of a number of lines provides additional bandwidth in the form of a variable bit rate portion of the service for the particular VCC.

The scheduler traverses each dynamic ABR table at the cell rate for the associated VPC. That is to say that the scheduler reads the next line of the ABR table, for a particular VPC, each time that the scheduler reads the index for that VPC from a line of the static table. As such, the speed of the movement of the pointer associated with each ABR is scaled as a finction of the percentage of bandwidth or cell rate allocated to the respective VPC.

The scheduler maintains a separate dynamic table for ABR services for each VPC that the scheduler supports. At any given time, each ABR VCC appears once and only once in a link list pointed to in the ABR table and the work list for that VPC. The bandwidth of an ABR VCC is represented by the 'Δt', which is determined by the current cell rate of this VCC. However, the VCC can only transmit when a cell time slot is available for ABR transmission and the particular VCC identifier is at the top of the work list. Each time that an ABR VCC is presented an opportunity to transmit, it is removed from the top of the work list by the scheduler and moved down the ABR table to a new location, if this time this VCC sends a data cell, not a null cell. The new distance down the table to the new location determines the time delay until the next retrieval and placement of the VCC on the work list and thus the next opportunity for this ABR VCC to send a cell.

In the example under discussion, there are four VPCs, therefore the scheduler maintains four dynamic ABR tables, portions of which appear in FIGS. 7A to 7D. Each ABR table has its own current pointer. The number of lines is the number of cell times assigned to the associated VPC in the static table. For example, in FIG. 6, the static table shows assignment of times a and e to VP1. The dynamic ABR table for VP1 (FIG. 7A) therefore has lines corresponding to a and e.

Each line of an ABR table includes head and tail pointers H, T. The pointers identify a link list of VCCs associated with the particular VPC. FIG. 8 shows the flow of the link list and work list processing. In the illustrated example, at time a, the scheduler reads H1, T1 from the ABR table for VP1. The scheduler uses those pointers to retrieve a list of ABR VCCs whose service times are due at this time slot. In the example, the retrieved list contains identifiers for VC4, VC5 and VC7 associated with VP1. The scheduler appends those VCC identifiers to the work list. In the example illustrated, VC6 and VC8 are presently in the work list for VP1 and VP6 is at the top (head) of the work list. The scheduler appends the new link list to the bottom of that work list.

When a transmit opportunity for VP1 arises, if there is no higher priority service ready to transmit, the scheduler picks up the VCC from the head (top) of the work list for VP1 to serve. In the example illustrated, VC6 is picked to serve. Ideally, the scheduler could go through the work list and find the first VCC that has a cell ready to send. But in reality, this design is not feasible for real-time processing. In the second embodiment presented here, only the VCC at the top or head of the work list is examined. If the VCC picked has no cell to send, a null cell is sent instead, and this VCC will not be rescheduled to the dynamic table. Assume for this example that VC6 has a cell ready to send. The scheduler initiates transmission for the cell for that circuit and reschedules service for VC6. In the future time slot, VC6 is either appended to the tail or added at the head of the linked list in the future time slot. The precise placement in the dynamic table depends on the applicable rescheduling algorithm.

More specifically, in this second embodiment, moving the pointers for an ABR link list down the ABR table by some distance ΔD reschedules service for the VCCs on that link list. As noted earlier, the scheduler traverses the ABR table for a particular VPC at a fraction of the cell rate corresponding to the fraction of the link rate allocated to that VPC. The rescheduling therefore also must be scaled to the appropriate percentage of bandwidth or link rate allocated to the VPC. In the preferred process, that distance ΔD equals the percentage bandwidth for the associated VPC multiplied by the reschedule time (ΔT) for this ABR VCC. The reschedule time (ΔT) equals the link rate divided by the allowed cell rate (ACR) for the ABR service to the particular VCC. The ACR value varies dynamically depending on traffic.

The second embodiment greatly simplifies modifications of the schedule table. In an actual implementation, the scheduler stores two copies of the scheduling table (FIG. 5) or two copies of the static table (FIG. 6). One copy of the table is active, and the other is not. To reprogram the service hierarchy, the microprocessor modifies the inactive copy of the table and transfers and changes the active/inactive status of the two tables. In the second embodiment, FIGS. 6 and 7, the dynamic tables need not be changed. It may be helpful to consider some examples on this point.

In the second implementation, tear-down or set-up of a real-time connection requires modification of the static schedule table. One control bit in a control and status register indicates which of the two static tables currently is in use. The microprocessor negotiates service with the appropriate data device 13 or 15 to define the circuit to be set up or torn down, and modifies the inactive static table to reflect this change. After completion of modification of this table, the microprocessor flips the control bit to activate usage of the new static table and to deactivate the other table. When the current time pointer reaches the end of the old table and wraps around to the cell time for the top of the table, the base of the new static table is copied to the current time pointer, and the scheduler begins using the new static table.

To set up or tear down a non-real time connection initiates a treatment of the circuit by modifing the rescheduling process in the appropriate dynamic, ABR table. For example, to set up such a connection, the microprocessor modifies a status register associated with the circuit. When the circuit first has traffic to send, the pointer pointing to the circuit is added to the work list for the appropriate VPC. To tear down a connection, the status register for the circuit is changed to inactive. After the next service opportunity is offered to the circuit, the scheduler will not reschedule service for that circuit in the ABR table.

As discussed above, the number of appearances of a VPC identifier in the VP index of the static table determines the bandwidth allocation to the VPC. To modify the bandwidth for a VP, the microprocessor changes the inactive copy of the static table to include the VPC in the appropriate number of lines for the new level of bandwidth and then activates the modified copy of the table in the manner outlined above.

If the scheduler completes the static table, dynamic table and work list processing without finding a circuit with a cell to send, the transmit opportunity passes down to one or more lower level service circuits. In the preferred implementation, the segmentation and reassembly circuit supports a number of other types of flow control, such as quantum flow control. For simplicity of discussion, however, assume that there is one lower level service, quantum flow control. Quantum flow control (QFC) processing maintains a 'credit' for each VCC subscribing to the service. For each VPC, the scheduler maintains a separate queue of VCCs for QFC based services. The scheduler identifies the VPC from the VP index in the static table and performs its processing for CBR, VBR and ABR, as discussed earlier. If the VPC assigned to a particular cell time has no cell ready to send for any VCC having those services, the scheduler looks to a queue of VCCs for QFC, associated with the currently identified VP, to fetch the VCC at the head of the queue.

When a QFC opportunity to transmit arises with respect to one VPC, the scheduler initiates transmission of the cell for that VCC. After transmission, if the VCC has more cells to send and it has more credits, it is appended to the tail of the QFC list for associated VPCs. Otherwise, it is simply removed from the QFC list. Next time, when it has traffic coming in and it also has credit updated, this VCC is appended to the tail of the QFC list. In this manner, all VCCs in a QFC list have both credits and a cell to send. When a transmission opportunity comes, all VCCs are ready to send a cell.

Figure 9:
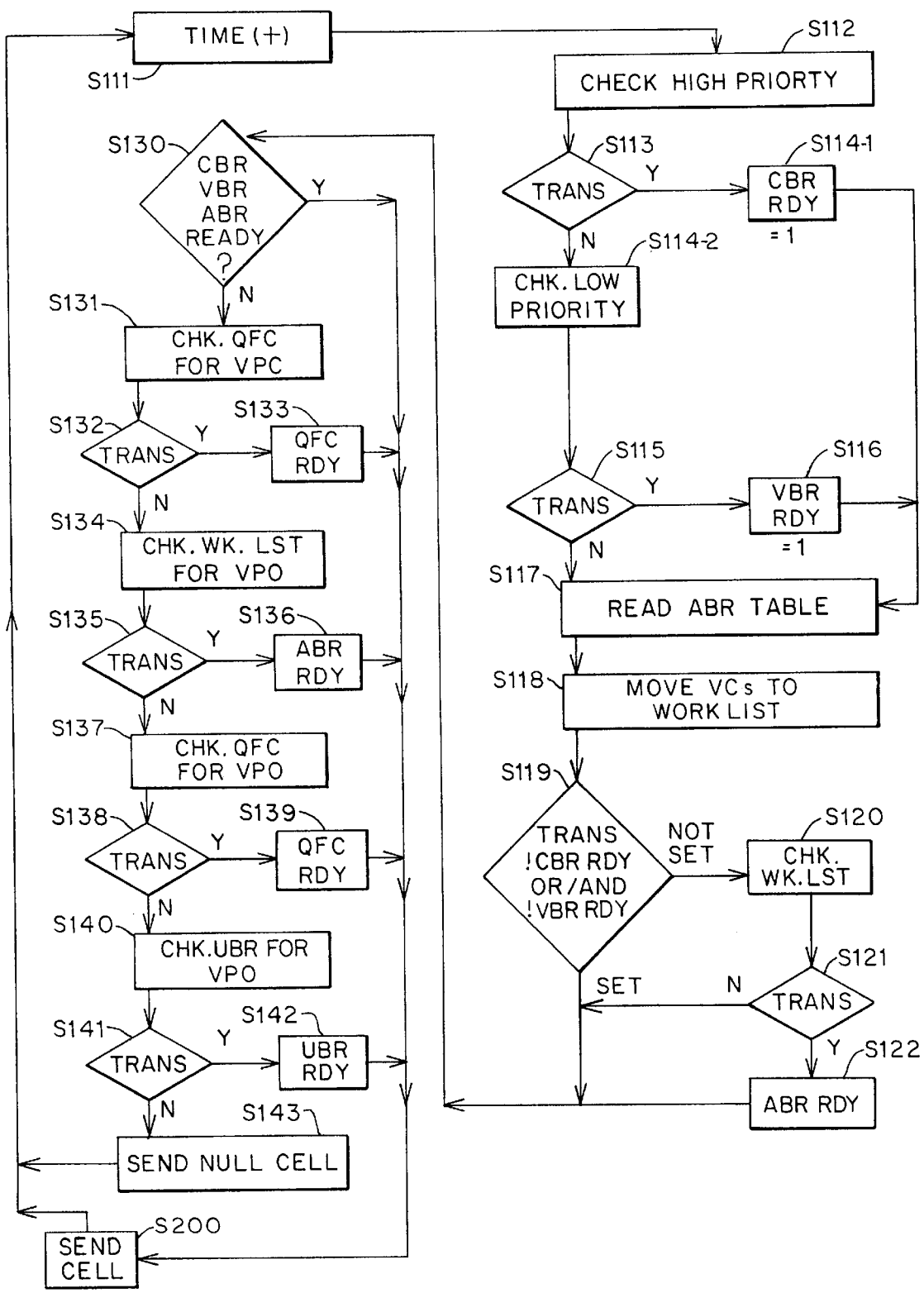
FIG. 9 is a flow chart illustrating the process flow in accord with the second embodiment of the present invention.

To ensure detailed understanding, it may be helpful to go through a specific process flow, with emphasis on the processing of the second embodiment of the scheduling tables. FIG. 9 is a flow chart illustrating this scheduling process.

The scheduler indexes the cell transmit time (S111) and accesses the line in the static table corresponding to the indexed cell time. From the first field in the line of the static table for that time slot, the scheduler identifies the VPC assigned that time slot. The scheduler next checks the high priority field of that line (S112) and determines if there is a VCC listed (S113). If there is a VCC listed in that field and this VCC has a cell ready to send, the identified VCC has a CBR service allocated to use of that time slot. Under these circumstances, the scheduler sets a bit indicating CBR ready and assigns this cell transmit slot to the identified CBR VCC (S114-1).

If the high priority field in the indexed line does not include a VCC for a CBR service or the listed CBR VCC has no cell to send, however, the scheduler next accesses the low priority field in the table (S114-2). The low priority field is used to identify VCCs for variable bit rate services. In any given line of the table, there may or may not be a low priority entry. If there is an entry in this field, the scheduler checks the circuit identified to determine if that circuit has a cell to send (S115). Under these circumstances, the scheduler sets a bit indicating VBR ready and assigns this cell transmit slot to the identified VBR VCC (S116). If there is no VCC listed in the low priority field or if a VCC is listed but has no cell to send, then the scheduler will not set the ready bit for ABR transmission.

The scheduler next reads the head and tail pointers from the indexed line of the ABR table for that VPC (S117). The head and tail pointers point to a link list of VCCs having ABR service. Using the pointers, the scheduler retrieves the link list and may move one or more of the VCCs contained in the particular link list to the work list for the currently identified VPC (S118). There are a number of possible algorithms that the scheduler may use to develop the work list. For example, a given link list may have some special priority requiring placement in the middle of the work list, at the top of the work list or at some other specified location on the work list. The scheduler may check to determine which circuits on the link list have a cell ready to transmit and transfer the VCC identifiers to the work list only for those circuits (if any) that have a cell to transmit. For simplicity of discussion here, assume that the scheduler appends all of each newly accessed link list of VCCs to the bottom of the work list as in the example of FIG. 8.

The scheduler now checks the ready status (S119). If either the CBR ready bit or the VBR ready bit is set, the scheduler skips forward (to step S130), without performing any processing on the ABR work list for the indexed VPC. However, if neither the CBR ready bit nor the VBR ready bit is set, the scheduler looks to the VCC at the head of the work list S120.

In the current example, the scheduler checks to determine if the first VCC in this list has a cell ready to transmit. If the first VCC in the work list has a cell to transmit, the scheduler sets a bit indicating ABR ready, assigns this cell transmit slot to the identified ABR VCC and removes the VCC from the work list. If the first VCC identified on the work list does not have a cell ready to transmit, the scheduler removes the VCC from the work list, but it does not set the ABR-ready bit (S122) and S122 is skipped. This process continues until the scheduler identifies an ABR VCC from the work list with a cell to transmit or until the scheduler completes traversal of the ABR work list for the indexed VPC without identifying a VCC that is ready to transmit (S121). If the scheduler finds a VCC having ABR service on this list with a cell to transmit, the scheduler sets the ABR-ready bit and assigns the slot to that VCC (S122). If the scheduler finds no VCC on the work list with a cell to send, the scheduler skips step S122.

The scheduler reaches step S130 either upon recognition of a ready status set for CBR or VBR (from S119) or upon completion of the ABR work list processing for the indexed VPC (from S121 or S122). At this point, the scheduler again checks ready status. If a ready bit is set for CBR, VBR or ABR, the scheduler jumps forward to its transmit process in step S200 and initiates transmission of the appropriate cell.

However, if the scheduler completed the work list for the ABR traffic for the currently indexed VPC without identifying a VCC with a cell to send, there will be no ready bit set when the scheduler checks status in step S130. The scheduler next considers QFC traffic for the indexed VPC (S131, S132). The scheduler checks if the QFC list for the indexed VPC is empty (S131, S132). If the QFC list is not empty, the scheduler initiates transmission of a cell for the VCC at the head of the list, and sets a bit indicating QFC ready (S133). The scheduler jumps forward to it's transmit process in step S200 and initiates transmission of the appropriate cell.

However, if at step S132 the scheduler has found no VCC on the QFC queue, the scheduler skips step S133.

The scheduler may go through tables and/or work lists for other types of traffic associated with the indexed VPC. For purposes of the present discussion, it is assumed that the QFC traffic is the lowest level service in the hierarchy associated with that VPC.

The virtual path identified as VP0 has special transmit privileges. It can transmit CBR, VBR and ABR traffic as scheduled by the tables and work list, in the same manner as the other VPCs. However, VP0 may also transmit ABR or QFC traffic in cell transmit time slots designated for other VPCs, any time that the VPC identified in the VP index field of the static schedule table does not have a cell ready to transmit. In the illustrated example, it is assumed for discussion that the indexed VPC was for a connection other than VP0. After going through all of the processes for the indexed VPC (CBR, ABR and QFC in the present example), the scheduler offers the cell transmit opportunity to ABR traffic associated with VP0. The scheduler checks the ABR work list (S134, S135) for VP0 in the same manner as for other VPCs. If the VCC at the head of the ABR work list for VP0 has a cell ready to transmit, the scheduler sets the ABR-ready bit during processing for VP0 (S136), the scheduler advances its processing to the transmission operation (S200) and sends the cell over the identified VCC for VP0.

If there is no ABR service VCC for VP0 with a cell to send, then the scheduler goes to the QFC queue for VP0 (at S137 and S138). If the QFC queue for VP0 is not empty, the scheduler sets the bit indicating QFC ready (S139), and proceeds to the transmission operations for the VCC at the top of the QFC list (S200).

If the scheduler finds an empty QFC queue for VP0, the scheduler may go to a work list or queue for another type of traffic, such as flow master or unspecified bit rate (UBR) (S140, S141). If the scheduler finds a UBR VCC ready for cell transmission in the appropriate list for VP0, the scheduler updates that work list. If the VCC was selected from an ABR list, the scheduler removes the pointer pointing to that VCC, that is the VCC itself, from the top of the work list and moves it down the ABR table for the particular VPC, to reschedule service for that VCC.

In the present example, there may be UBR traffic for VP0 but no other traffic types, therefore if there is no UBR traffic scheduled for VP0, none of the circuits offered this cell transmit opportunity have a cell to send. Accordingly, the scheduler initiates transmission of a null cell (S143).

In step 200, if the scheduler set any of the ready bits, the scheduler uses the appropriate identification for the VCC that caused the setting of the particular ready bit and initiates transmission of the cell for that VCC. The cell transmitted includes a VPI corresponding to the indexed VPC and a VCI corresponding to the identified VCC, to logically place the transmitted cell in the virtual path and in the virtual circuit within that path. Thus, if the scheduler set the CBR-ready bit, the scheduler initiates transmission of the cell for the VCC identified as the CBR service VCC for this cell transmit time in the high priority field of the indexed line of the static table for the indexed VPC. If the scheduler set the VBR-ready bit, the scheduler initiates transmission of the cell for the VCC identified as the ABR service VCC for this cell transmit time in the low priority field of the indexed line of the static table for the indexed VPC. If the scheduler set the ABRready bit during processing of the ABR work list for the indexed VPC, then the scheduler initiates transmission of the cell for the VCC from that list. If the scheduler set the QFC-ready bit during processing of the QFC queue for the indexed VPC, then the scheduler initiates transmission of the cell for the VCC from that list. If the scheduler set the ABR-ready bit during processing of the ABR work list for VP0, then the scheduler initiates transmission of the cell for the VCC from that list. If the scheduler set the QFC-ready bit during processing of the QFC queue for VP0, then the scheduler initiates transmission of the cell for the VCC from that list. If the scheduler set the UBR-ready bit during UBR processing for VP0, then the scheduler initiates transmission of the cell for the VCC having the UBR service.

If the cell transmission was for a VCC from one of the ABR or QFC lists, the scheduler updates that list. If the VCC was selected from an ABR list, the scheduler removes the link list containing that VCC from the particular work list and moves the head and tail pointers down the ABR table for the particular VPC, to reschedule service for that VCC. Also, the scheduler similarly removes pointers and reschedules service for any link lists passed over in the work list processing because there were no cells ready to transmit for the identified circuits. The distance down the ABR table that the scheduler moves the pointers for each link list depends on the scheduling algorithm, traffic and/or the level of ABR service provided to the particular VCC. If the VCC was selected from a QFC list, then the scheduler moves the VCC down that queue and deducts one transmission from the credit assigned to the VCC. Periodically, the scheduler refreshes QFC credit for each VCC.

Next, the scheduler increments the cell transmit time (S111) and begins the scheduling process again. In particular, the scheduler will read the next line in the static table and begin processing for the VPC identified in that next line. The current pointer for the ABR table for that VPC also increments to the next line.

From the above discussion, it should be apparent that additional work lists can be provided to support other types of traffic, either associated with the indexed VPC, associated with VP0 or independent from any identified VPC. If the additional queue or work list process is added after the QFC processing for the indexed VPC but before VP0 processing, the list would relate to service associated with the one VPC. If added after the VP0 processing, the service may be one associated with VP0 or independent of VP. However, such a service is at the bottom end of the hierarchical scheduling process. VCCs identified in such a bottom-end process would receive service only after all CBR and VBR service checks for the indexed VPC and after offering the transmit opportunity to VCCs on the ABR work lists and QFC work lists for both the indexed VPC and VP0.

To recap, it may be helpful to consider the following summary of operation of a working embodiment. Each CBR or VBR VCC has a 'ready bit' to indicate if the circuit has data cells ready. This 'ready bit' could be kept on external memory (e.g. memory 29), but preferably it is kept on the scheduler chip. When cells of either CBR or VBR circuits are ready to send, the scheduler sets the 'ready bit' for that VCC to one. Every time a cell of a CBR or VBR VCC is transmitted, this VCC's 'ready bit' is cleared to zero.

Each VP has a work list for its ABR VCCs. Each ABR VCC appears once and only once in either the work list or one of the linked lists identified in the ABR schedule table, if this VCC has a cell to send. When cells for an ABR VCC are ready to send, if this VCC is not in any list, neither the work list nor a linked list, this VCC is appended to the tail of its VPC's work list. Otherwise, nothing happens. When a cell of an ABR VC is transmitted, if this VCC still has cells to send, its service then is rescheduled to the future time. To do so, the VCC is put into a linked list whose head and tail pointer are in the future time slot in the ABR table. If this VCC has nothing more to send, it is not put into any list.

At any cell time slot, the scheduler always checks the high priority VCC column in the static table first. If there is a VCC scheduled in the high priority column and this VCC has a cell to send, indicated by 'ready bit' for this circuit, the cell transmission time is given to this high priority VCC. Otherwise, the transmission opportunity is passed to the low priority column. For example, if the cell time pointer is pointing to cell time A, the static table (FIG. 6) lists VC1 in the high priority column and VC4 in the low priority column. If the 'ready bit' for VC1 is set, meaning that there is a cell ready for transmission, VC1 is served. If 'ready bit' for VC1 is not set, the transmission opportunity passes to VC4 in the same row. If the cell time pointer is pointing to cell time B, there is no VCC in the high priority column and the transmission opportunity passes to the VC3 listed in the low priority column. At any cell time slot, if there is no VCC in the high priority column, or the VCC in the high priority column has no data to send, the scheduler checks the VCC in the low priority column. If there is a VCC in the low priority column and the 'ready bit' for that VCC is set, a cell is transmitted for that VCC. Otherwise, an ABR linked list from the ABR table for this VPC is checked. For example, if the cell time pointer is pointing to cell time B and VC3 has its 'ready bit' set, a cell for VC3 is sent. Otherwise, the ABR schedule table for VP2 is checked. At any cell time slot, the linked list in the current served VP's ABR table pointed by its current pointer is appended to this VP's work list. If there is no service request from either the high priority VCC or the low priority VCC from the static table, the VCC in the head of this VP's work list is served. The current pointer of the ABR table increments.

Consider an example in which the cell time pointer is pointing to cell time B, the current served VP is VP2. In VP2's ABR table, the current pointer p2 is pointing to the linked list with head and ail H6 and T6, respectively. This linked list is appended to the work list of VP2. There is no VCC in the high priority VCC column and the 'ready bit' for VC3 of the low priority VCC column is not set. So the VCC at the head of the work list of VP2 is then served in the current slot time. If this VCC has more cells to send, it is reschedule to the future time, i.e. another slot in the ABR table for VP2. Depending on the algorithm used, tie rescheduled VCC could be inserted to the head of the linked list in the future time slot or the tail of that list. The current pointer p2 proceeds to the next line containing the linked list with head and tail H9 and T9, respectively. When the current pointer p2 reaches the end of this ABR table, it goes back to the beginning of the table.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A hierarchical method of scheduling, over a plurality of cell transmit times asynchronous transfer mode (ATM) cell traffic for transmission over an ATM link supporting a plurality of virtual path connections that may utilize bandwidth on the ATM link, the method comprising:

for each respective cell transmit time:
(a) identifying one virtual path connection that is assigned to the respective cell transmit time, the identified one virtual path connection being one of the plurality of virtual path connections on the ATM link;
(b) determining if there is a virtual circuit connection, from among a plurality of virtual circuit connections associated with the identified one virtual path connection, having a high priority service that is assigned to the respective cell transmit time, and if so determined, presenting an opportunity to transmit an ATM cell for the determined high priority service virtual circuit connection over the ATM link in the respective cell transmit time;
(c) identifying at least one available bit rate (ABR) service virtual circuit connection, from among a plurality of available bit rate service virtual circuit connections associated with the one virtual path connection, associated with the respective cell transmit time; and
(d) if no ATM cell was transmitted for a high priority service virtual circuit connection in the respective cell transmit time, scheduling transmission of an ATM cell for the identified available bit rate service virtual circuit connection over the ATM link in the respective cell transmit time.

2. The method as in claim 1, wherein identifying one virtual path connection comprises indexing a line of a schedule table for each respective cell transmit time and retrieving an identifier of the one virtual path connection from the line in the table.

3. The method as in claim 2, wherein determining if there is a virtual circuit having a high priority service comprises accessing a high priority identifier field in the line in the table to determine if the field contains an identifier for a virtual circuit connection.

4. The method as in claim 3, wherein identifying at least one available bit rate service comprises accessing a link list associated with the one virtual path connection.

5. The method as in claim 4, wherein accessing a link list comprises:
obtaining a pointer from a field of the line in the table and using the pointer to retrieve the link list from a memory containing a plurality of link lists.

6. The method as in claim 5, further comprising:
moving the pointer from the line in the table to a new position, after transmitting an ATM cell for the available bit rate service virtual circuit connection, to reschedule service relating to the available bit rate service virtual circuit connection.

7. The method as in claim 1, wherein presenting an opportunity to transmit the ATM cell comprises:
transmitting an ATM cell for the high priority service virtual circuit connection over the ATM link in the respective cell transmit time, to provide a constant bit rate service.

8. The method as in claim 1, wherein presenting an opportunity to transmit comprises:
determining if an ATM cell is ready for transmission in the respective cell transmit time for the high priority service virtual circuit connection; and
if there is an ATM cell ready for the high priority service virtual circuit connection, transmitting the ATM cell for the high priority service virtual circuit connection over the ATM link in the respective cell transmit time, to provide a variable bit rate service.

9. The method as in claim 1, wherein:
identifying at least one ABR service virtual circuit connection comprises adding the identity of the at least one available bit rate service virtual circuit connection to a work list; and
scheduling transmission of the ATM cell comprises selecting one virtual circuit connection from the work list as the identified available bit rate service virtual circuit connection.

10. A device for scheduling, over a plurality of cell transmit times, asynchronous transfer mode (ATM) cell traffic for transmission over an ATM link supporting a plurality of virtual path connections that may utilize bandwidth on the ATM link, the device comprising:
means for identifying one virtual path connection that is assigned to each respective cell transmit time, the identified one virtual path connection being one of the plurality of virtual path connections on the ATM link;
means for determining if there is a virtual circuit connection, from among a plurality of virtual circuit connections associated with the identified one virtual path connection, having a high priority service that is assigned to the respective cell transmit time, and if so determined, presenting an opportunity to transmit an ATM cell for the determined high priority service virtual circuit connection over the ATM link in the respective cell transmit time;
a plurality of link lists stored in memory;
means for accessing a link list from the memory, the accessed link list identifying at least one available bit rate ABR service virtual circuit connection, from among a plurality of available bit rate service virtual circuit connections associated with the one virtual path connection and associated with the respective cell transmit time; and means for accessing the work list to identify an available bit rate service virtual circuit connection having an ATM cell ready for transmission and for scheduling transmission of the ATM cell for that available bit rate service virtual circuit connection over the link in the respective cell transmit time if no ATM cell was transmitted for a high priority service virtual circuit connection in the respective cell transmit time.

11. The device as in claim 10, comprising a scheduler in an ATM segmentation and reassembly circuit.

12. The device as in claim 11, wherein the ATM segmentation and reassembly circuit is implemented in an ATM user network interface.

13. The device as in claim 10, further comprising a work list stored in memory, wherein the link list accessing means appends an identification of at least one virtual circuit connection from the accessed link list to the work list, and the work list accessing means selects one virtual circuit connection from the work list.

14. The device as recited in claim 13, wherein the work list stored in memory comprises a plurality of separate work lists, each separate work list being associated with one of the virtual path connections that may utilize bandwidth on the ATM link.

15. A method of scheduling, over a plurality of cell transmit times, asynchronous transfer mode (ATM) cell traffic for transmission over an ATM link, the method comprising:

supporting a plurality of virtual path connections that may utilize bandwidth on the ATM link; and for each respective cell transmit time:

(a) identifying one virtual path connection that is assigned the respective cell transmit time, the identified one virtual path connection being one of the plurality of virtual path connections on the ATM link;

(b) determining if there is a high priority virtual circuit connection that is assigned to the respective cell transmit time from among a plurality of high priority virtual circuit connections associated with the identified one virtual path connection, and if it is determined that there is an assigned high priority virtual circuit connection, transmitting an ATM cell for the determined assigned high priority virtual circuit connection over the ATM link in the respective cell transmit time;

(c) if it is determined that there is no assigned high-priority virtual circuit connection for the respective cell transmit time, determining if there is a low-priority virtual circuit connection that is assigned to the respective cell transmit time from among a plurality of low priority virtual circuit connections associated with the identified one virtual path connection and providing an opportunity to transmit an ATM cell for the determined assigned low priority virtual circuit connection over the ATM link in the respective cell transmit time;

(d) identifying at least one available bit rate service virtual circuit connection that is assigned to the respective cell transmit time from among a plurality of available bit rate service virtual circuit connections associated with the identified one virtual path connection;

(e) adding the identity of the identified at least one available bit rate service virtual circuit connection to a work list; and (f) if no ATM cell was transmitted for either a high priority virtual circuit connection or a low priority virtual circuit connection in the respective cell transmit time, accessing the work list to identify an available bit rate service virtual circuit connection, and transmitting an ATM cell for the identified available bit rate service virtual circuit connection over the ATM link in the respective cell transmit time.

16. The method as in claim 15, further comprising rescheduling an ATM cell transmit opportunity for any available bit rate service virtual circuit connection that transmits an ATM cell for future addition to the work list in accord with a predetermined scheduling algorithm.

17. The method as in claim 15, wherein identifying one virtual path connection comprises indexing a line in a scheduling table for the respective cell transmit time to obtain an identifier of the one identified virtual path connection.

18. The method as in claim 17, wherein the line in the scheduling table includes fields which may contain identifiers for the high priority and low priority virtual circuit connections.

19. The method as in claim 17, wherein identifying at least one available bit rate service virtual circuit comprises accessing a link list associated with the one identified virtual path connection.

20. The method as in claim 19, wherein the line in the scheduling table includes at least one pointer to identify the link list from among a plurality of link lists contained in a memory.

21. The method as in claim 20, wherein the line in the scheduling table further includes a datum for use in moving the pointer to reschedule service for the identified available bit rate virtual circuit connection.

22. An asynchronous transfer mode (ATM) processing device, comprising:

a media access control interface for receiving data relating to a plurality of data communication services from one or more data devices;

a segmentation processor for segmenting data received via the media access control interface and for adapting the segmented data into ATM cells;

a link interface for transmitting the ATM cells over an ATM link to a node of an ATM network; and a programmable cell transmission scheduler for scheduling the transmission of ATM cells for each data conmmunication service through the link interface;

wherein:

each data communication service is assigned to one of a plurality of virtual path connections on the ATM link and to one of a plurality of virtual circuit connections associated with the assigned virtual path connection;

at each respective cell transmit time, the scheduler identifies one virtual path connection that is assigned to the respective cell transmit time, determines if a high priority virtual circuit connection from among a plurality of high priority virtual circuit connections associated with the identified one virtual path connection is assigned to that cell transmit time, and if so determined, controls the link interface to transmit an ATM cell for the determined high-priority virtual circuit connection over the ATM link;

at each respective cell time, the scheduler also accesses a link list identifying at least one available bit rate service virtual circuit connection that is assigned to the respective cell transmit time from among a plurality of available bit rate service virtual circuit connections associated with the identified one virtual path connection and transfers the accessed link list to a work list corresponding to the identified one virtual path connection; and during any cell times assigned to the identified one virtual path connection for which there is no high priority cell to transmit, the scheduler accesses the work list corresponding to the identified one virtual path connection to identify an available bit rate service virtual circuit connection having an ATM cell to transmit and controls the link interface to transmit the ready ATM cell for the identified available bit rate service virtual circuit connection over the ATM link in the respective cell transmit time.

23. An asynchronous transfer mode (ATM) processing device, comprising:

a media access control interface for receiving data relating to a plurality of data communication services from one or more data devices;

a segmentation processor for segmenting data received via the media access control interface and for adapting the segmented data into ATM cells;

a link interface for transmitting the ATM cells over an ATM link to a node of an ATM network;

a programmable cell transmission scheduler for scheduling the transmission of ATM cells for each data communication service through the link interface; and a scheduling table, stored in memory, for use by the programmable cell transmission scheduler, the scheduling table comprising a plurality of lines, wherein each line of the table comprises an index identifying one of a plurality of virtual path connections that may utilize the link, a field for an identifier of a virtual circuit connection that may have a high priority service and at least one field for a pointer to a virtual circuit connection link list for one or more low priority services.

24. The device as recited in claim 23, wherein each line of the table further comprises an indicia of the next serve time indicating downward movement of the pointer to another line upon servicing a virtual circuit connection identified in the link list.

* * * * *